Jan. 7, 1969 J. E. KIEFER ET AL 3,420,245
PARTICULATE CELLULOSE ACETATE TOBACCO SMOKE FILTER
Filed Feb. 5, 1965
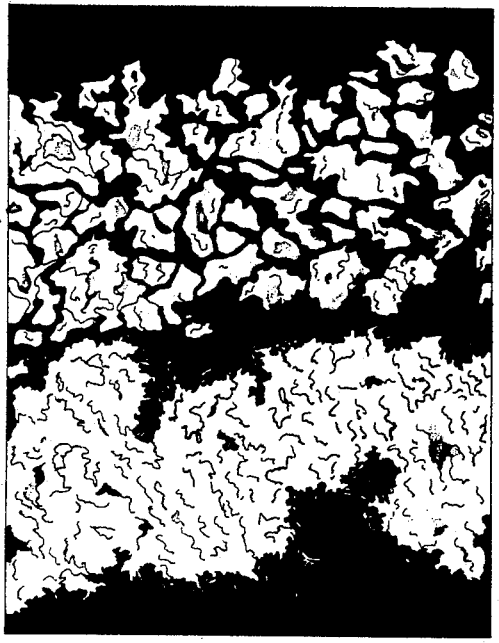
PRIOR ART PARTICLES
PARTICLES OF THIS INVENTION
JOHN E. KIEFER
GEORGE P. TOUEY
INVENTORS
BY R. Frank Smith
Obrum H. Hatcher
ATTORNEYS United States Patent Office 3,420,245
Patented Jan. 7, 1969

3,420,245
PARTICULATE CELLULOSE ACETATE TOBACCO SMOKE FILTER
John E. Kiefer and George P. Touey, Kingsport, Tenn., assignors to Eastman Kodak Company, Rochester, N.Y., a corporation of New Jersey
Filed Feb. 5, 1965, Ser. No. 430,615
U.S. Cl. 131—261　　2 Claims
Int. Cl. A24f 7/04; A24f 13/04

ABSTRACT OF THE DISCLOSURE

Flake acetate which is packed into aerosol filter and in particular filters for cigarette smoke. The particules have a mesh size of 20–60 and are characterized by hair-like protrusions in substantially all directions with a characteristic occurrence in clusters.

---

This invention relates to tobacco smoke filters. More particularly it relates to improved cellulose acetate filter elements.

Our co-worker Meyer in Ser. Nos. 456,534 (filed Sept. 16, 1954), 197,305 (filed May 24, 1962, now U.S. Patent 3,201,505), and 380,382 (filed June 5, 1964) has disclosed particles of cellulose acetate which have a high affinity for tars, nicotine and phenols commonly occurring in tobacco smoke and are thus efficient in removing such materials from the smoke when used in filter elements. While the cellulose acetate of Meyer has proved highly successful in removal of tars and the like from tobacco smoke, cigarette manufacturers are interested in a filter element which will act even more efficiently in this respect. Therefore, development of a material which will permit improved filtration of tobacco smoke represents a highly desirable result. After extended investigation we have developed an improved tobacco smoke filter and a new type of acetate for use therein.

One object of this invention is to provide a new type of cellulose acetate useful in production of filter elements of the class indicated. Another object is to provide an improved cellulose acetate filter element. Further objects will be apparent from the description and caims which follow.

In its broader aspects our invention involves utilization in filter elements of hairy-appearing coarse particles of cellulose acetate prepared by precipitation from a dilute solution. The particles are 20 to 60 mesh (U.S.S. Sieve) in size, preferably 20 to 30, have a surface area of greater than 15 (preferably 18–30) square meters per gram (m.²/g.) and a bulk density of 1.5 to 4.0 (preferably 1.8 to 2.5) pounds per cubic foot, (lb./cu. ft.). They are characterized by heterogeneous hair-like protrusions from the main mass of the particle in substantially all directions. According to our invention these particles may be formed into tobacco smoke filter elements by injection into a cylindrical tube and plugging the tube at both ends with a porous material prior to attachment to cigarettes.

Another method of forming our particular acetate into filter rods includes the following steps. A textile tow is spread out and dusted with the cellulose acetate of this invention. The tow is bundled into a cord with the cellulose acetate intermingled uniformly throughout the tow. The tow is then fabricated into cigarette filter rods.

Further details as to ways in which filter rods may be prepared from cellulose acetate particles may be found in our co-worker Meyer's above-mentioned patent applications.

The 20–60 mesh particles of our invention are preferably prepared by precipitation of a solution of cellulose acetate in an organic solvent such as acetic acid or the like. When acetic acid is used as solvent and precipitant the solution to which precipitant is added should contain about 5 to 10 percent cellulose ester, 1 to 10 percent water, and the remainder acetic acid. The precipitant should be aqueous acetic acid containing 20 to 40 percent acetic acid.

A better understanding of our invention may be had by reference to the accompanying drawing forming a part of this application made from a photomicrograph of a portion of our precipitated acetate particles, and prior art particles.

The following examples are illustrative of our invention.

Example I.—Preparation of filter material

A solution consisting of 6 parts cellulose acetate, 10 parts water, and 84 parts acetic were slowly added to a 30 percent aqueous acetic acid solution while the solution was stirred slowly. The precipitated material was isolated by filtration and water washed. The dried material was screened to obtain a particle size of 20 to 60 mesh and the particles were characterized by hairy protrusions such as shown in the drawing herewith referred to above.

Example II.—Comparison of various materials as cigarette smoke filters

Paper cylinders 20 mm. long and 8 mm. in diameter were packed with the dried precipitated acetate of Example I. The end of each cylinder was plugged with a 3 mm. length of a continuous filament cellulose acetate filter rod. The precipitate was packed sufficiently in each cylinder to give a pressure drop of 2.8 inches of water at an air flow of 1050 ml./min.

The cylinders of tubular or rod-shaped filter elements were attached to the commercial king-size cigarettes, each of which had been shortened by 20 mm. The filter cigarettes were smoked by means of an automatic smoking machine and the amounts of tar removed by the filters were determined by the method described by McConnell et al., in Tobacco Science 4, 55–61 (1960). The same number of cigarettes having granular cellulose acetate filter elements and the same number of cigarettes having cellulose acetate tow filter elements were similarly smoked.

| Fibrous Material | Surface area [1] (mg.) | Wt. of filter material (mg.) | Average tar removal by elements (percent) |
|---|---|---|---|
| Hairy cellulose acetate of Example I | 24.3 | 48 | 72 |
| Granular cellulose acetate | 6.5 | 213 | 56 |
| Continuous filament cellulose acetate | 0.2 | 95 | 38 |

[1] Surface area was determined by method of Nelson Eggertsen, Ana Chem 30 1387 (1958).

The preceding description and examples show preparation and use of 20–60 mesh hairy cellulose acetate particles of improved filtration efficiency when used in tobacco smoke filter elements.

Although the invention has been described with particular reference to certain preferred embodiments thereof, certain variations and modifications can be effected within the spirit and scope of the invention as described hereinabove.

We claim:
1. A tobacco smoke filter element comprising flocculent cellulose acetate particles having a mesh size of 20 to 60, a surface area greater than 15 square meters per gram, and a bulk density of 1.5 to 4.0 pounds per cubic foot and characterized by heterogeneous hair-like protrusions in substantially all directions from the main mass of each of said particles.

2. The element according to claim 1, wherein said cellulose acetate particles have a mesh size of 20 to 30, a surface area of 18 to 30 sqaure meters per grams, and a bulk density of 1.8 to 2.5 pounds per cubic foot.

References Cited
UNITED STATES PATENTS

| | | | |
|---|---|---|---|
| 2,806,474 | 9/1957 | Yarsley | 131—265 |
| 3,251,365 | 5/1966 | Kieth et al. | 131—10.7 |
| 2,740,776 | 4/1956 | Rosen et al. | 260—227 |
| 3,126,009 | 3/1964 | Mahoney et al. | 131—265 |

SAMUEL KOREN, *Primary Examiner.*

D. J. DONOHUE, *Assistant Examiner.*

U.S. Cl. X.R.

131—265, 268; 260—227